(12) United States Patent
Tonami et al.

(10) Patent No.: US 8,294,108 B2
(45) Date of Patent: Oct. 23, 2012

(54) RADIATION DETECTOR AND TOMOGRAPHY EQUIPMENT PROVIDED WITH THE SAME

(75) Inventors: Hiromichi Tonami, Kyoto-fu (JP); Tomoaki Tsuda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 69 days.

(21) Appl. No.: 12/864,726

(22) PCT Filed: Feb. 4, 2008

(86) PCT No.: PCT/JP2008/051765
§ 371 (c)(1),
(2), (4) Date: Jul. 27, 2010

(87) PCT Pub. No.: WO2009/098753
PCT Pub. Date: Aug. 13, 2009

(65) Prior Publication Data
US 2010/0308227 A1    Dec. 9, 2010

(51) Int. Cl.
*G01T 1/161*   (2006.01)
(52) U.S. Cl. .............. 250/363.02; 250/367; 250/368
(58) Field of Classification Search ........... 250/368, 250/367, 363.02
See application file for complete search history.

(56) References Cited

U.S. PATENT DOCUMENTS

| | | | | |
|---|---|---|---|---|
| 4,694,177 A * | 9/1987 | Akai | .............. | 250/368 |
| 4,945,241 A * | 7/1990 | Yamashita et al. | ............. | 250/367 |
| 6,298,113 B1 * | 10/2001 | Duclos et al. | .................. | 378/19 |
| 6,362,479 B1 * | 3/2002 | Andreaco et al. | ............. | 250/366 |
| 6,965,661 B2 * | 11/2005 | Kojima et al. | .................... | 378/4 |
| 7,718,972 B2 * | 5/2010 | Tsuda et al. | ................. | 250/367 |
| 2004/0178347 A1 | 9/2004 | Murayama et al. | | |
| 2011/0101229 A1* | 5/2011 | Inadama et al. | ............. | 250/367 |

FOREIGN PATENT DOCUMENTS

JP   2004-279057 A   10/2004

OTHER PUBLICATIONS

Tsuda et al., A Four-Layer Depth of Interaction Detector Block for Small Animal PET, Oct. 2004, IEEE Transactions on Nuclear Science, Vo 51, pp. 2537-2542.*

International Search Report for the Application No. PCT/JP2008/051765 mailed Apr. 8, 2008.

\* cited by examiner

*Primary Examiner* — Christine Sung
(74) *Attorney, Agent, or Firm* — Cheng Law Group, PLLC

(57) ABSTRACT

In a scintillator of a radiation detector according to this invention, first reflectors provided in first scintillation counter crystal layer adjacent to one another have gaps wider than first reflectors provided in second scintillation counter crystal layer such that an overall width of the first reflectors in the first scintillation counter crystal layer in an arranging direction is identical to an overall width of the first reflectors in the second scintillation counter crystal layer in an arranging direction. Such construction improves spatial resolution at a side end of the scintillator.

12 Claims, 11 Drawing Sheets

Fig.2
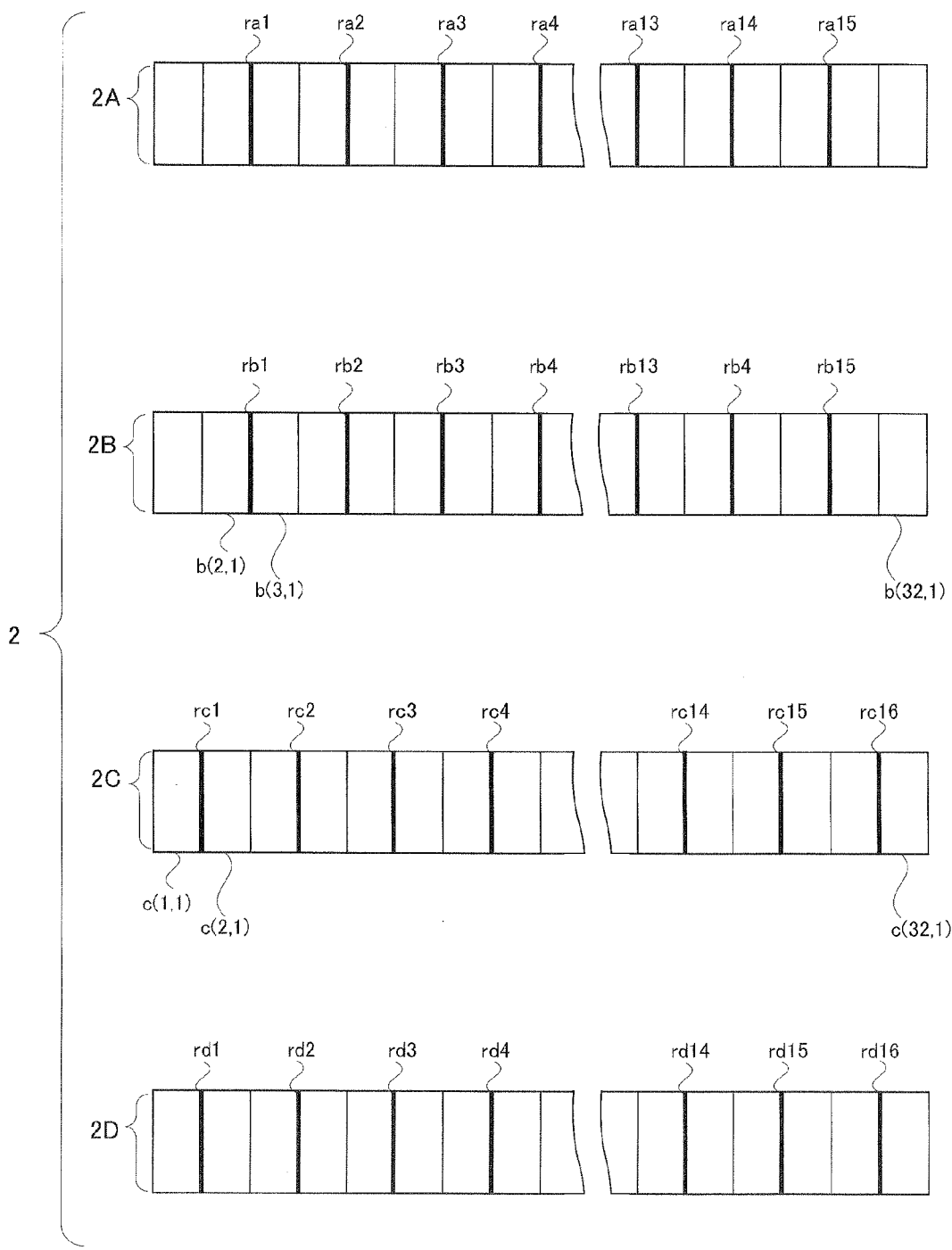
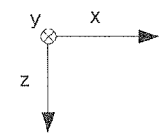

Fig.6
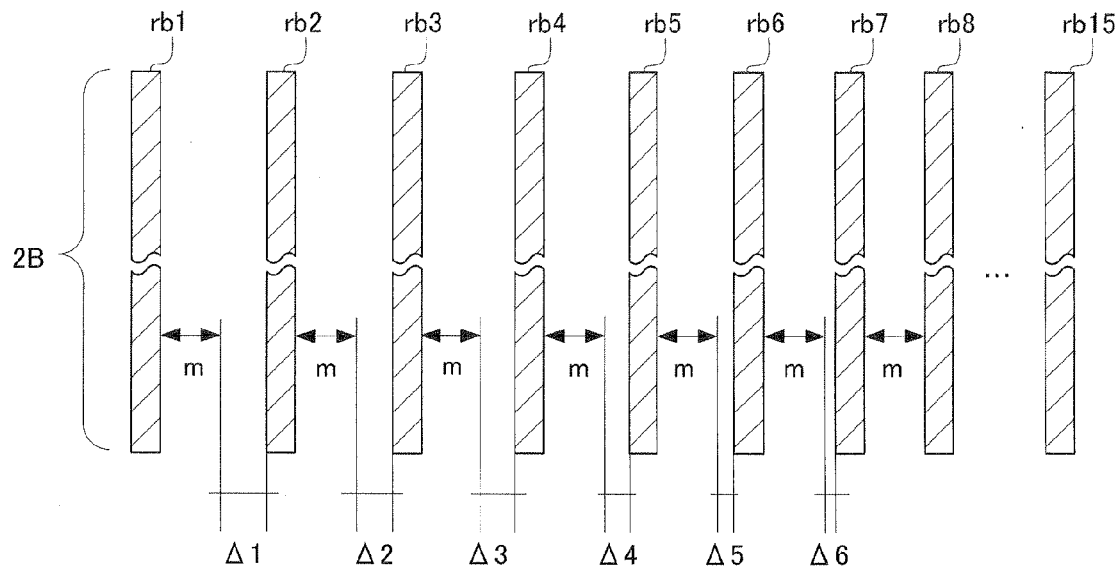
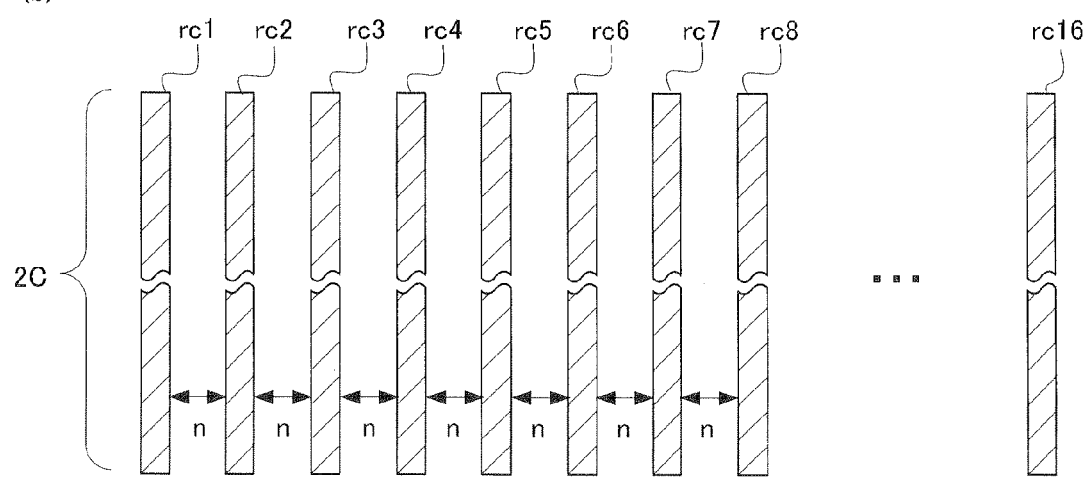
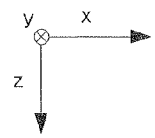

Fig. 7
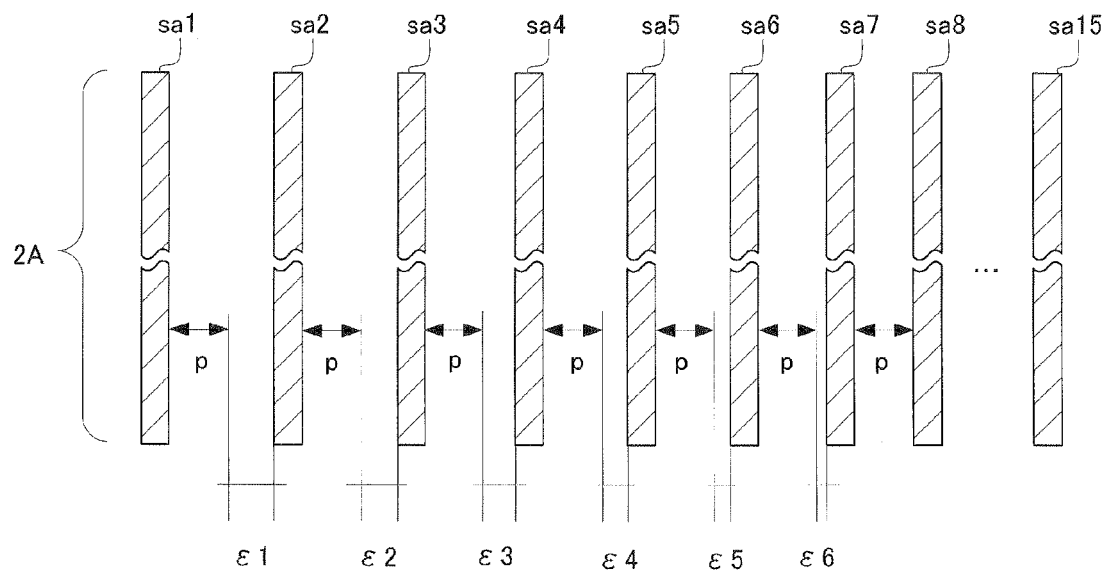
(a)
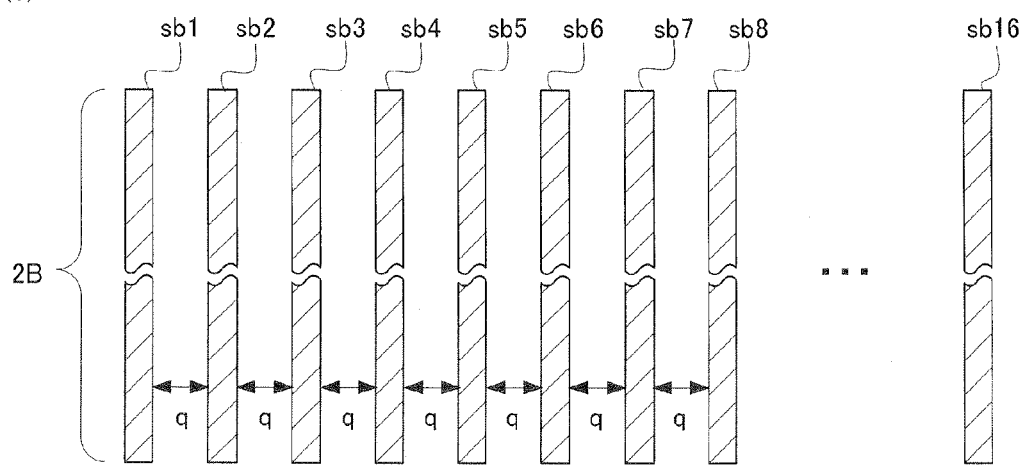
(b)
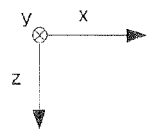

Fig.8
(a)
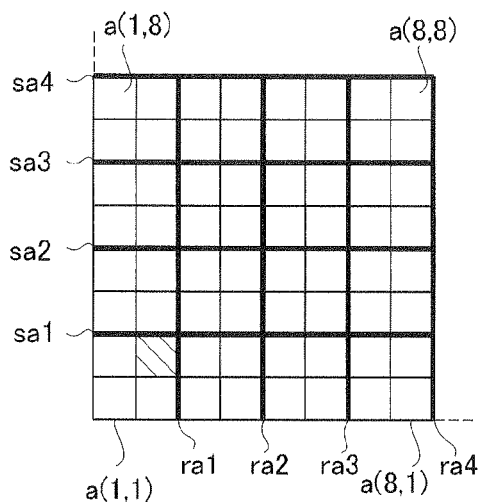
(b)
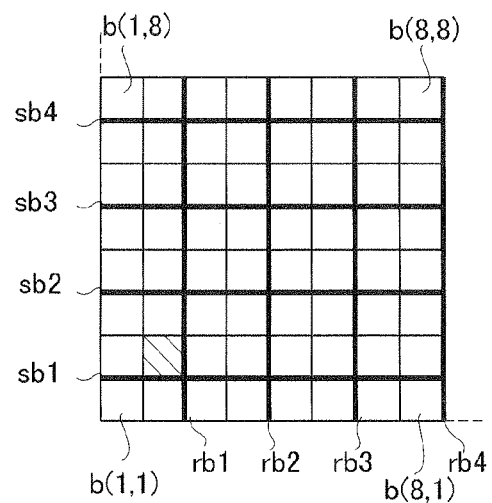
(c)
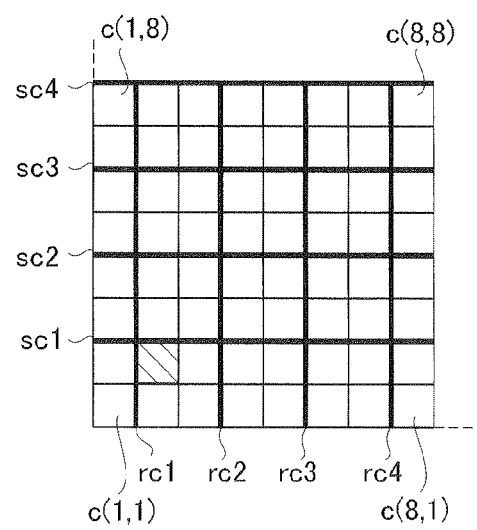
(d)
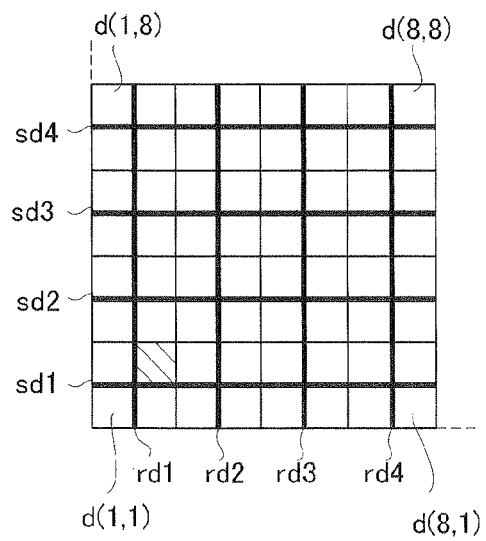

Fig.10
(a)
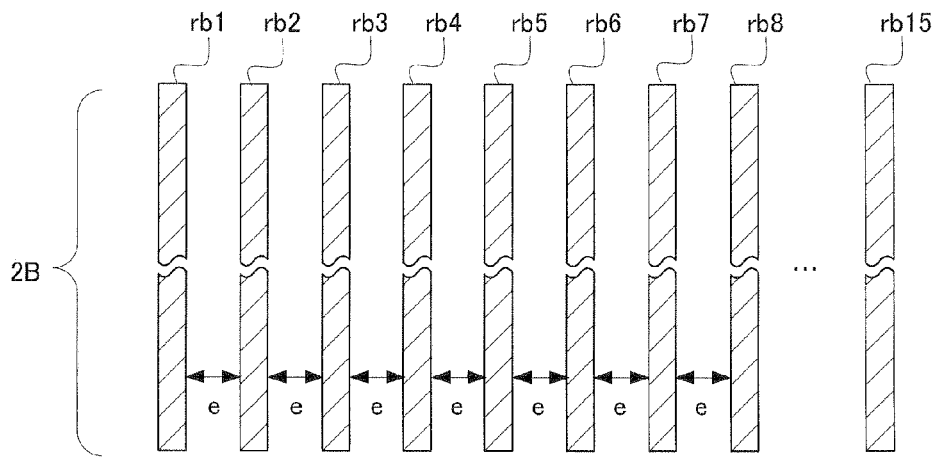
(b)
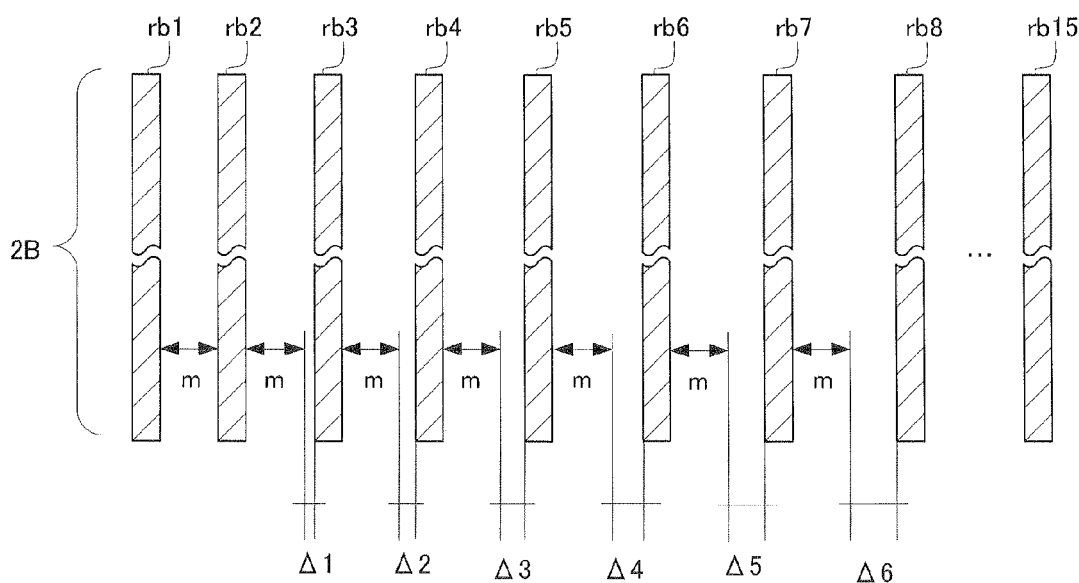
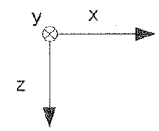

RADIATION DETECTOR AND TOMOGRAPHY EQUIPMENT PROVIDED WITH THE SAME

TECHNICAL FIELD

This invention relates to a radiation detector having a scintillator, a light guide, and a photomultiplier tube optically coupled in turn, and tomography equipment provided therewith.

BACKGROUND ART

This type of radiation detector is used in emission computed tomography (ECT: Emission Computed Tomography) equipment to detect radiation (such as gamma rays) emitted from radiopharmaceutical that is administered to a subject and is localized to a site of interest for obtaining sectional images of the site of interest in the subject showing radiopharmaceutical distributions. Typical ECT equipment includes, for example, a PET (Positron Emission Tomography) device and an SPECT (Single Photon Emission Computed Tomography) device.

A PET device will be described by way of example. When examinations are performed through a PET device provided with the foregoing radiation detector, radiopharmaceutical labeled with positron emitting nuclides is firstly administered to a subject by injection. The positron emitting nuclides undergo β+ decay within the subject to produce positrons. The positrons immediately collide with electrons in the subject to annihilate, and simultaneously to produce a pair of gamma rays (an annihilation gamma ray-pair) that travels in opposite directions to each other. The PET device obtains sectional images showing radiopharmaceutical distributions in the subject through coincidence of the annihilation gamma ray-pairs with a detector ring.

Such radiation detector arranged in the detector ring of the PET device is often equipped that is capable of position discrimination in a depth direction of a scintillator provided in the radiation detector for improved resolution. Particularly, such radiation detector is used, for example, in a PET device set for animals. FIG. 11 is a perspective view showing a construction of a conventional radiation detector. Such radiation detector 50 is composed of scintillation counter crystal layers 52A, 52B, 52C, and 52D in which scintillation counter crystals 51 of parallelepiped are accumulated in two dimensions, and a PMT 54 having a function of position discrimination that detects fluorescence irradiated from each of the scintillation counter crystal layers 52A, 52B, 52C, and 52D. Here, each of the scintillation counter crystal layers 52A, 52B, 52C, and 52D is laminated in a z-direction to form a scintillator 52 that converts incident radiation into fluorescence.

Two or more reflectors 53 are provided in each of the scintillation counter crystal layers 52A, 52B, 52C, and 52D. The reflectors 53 are arranged so as to be inserted between the scintillation counter crystals 51 that forms each of the scintillation counter crystal layers 52A, 52B, 52C, and 52D for reflecting fluorescence produced by the scintillation counter crystals. The reflector 53 does not surround each scintillation counter crystal 51 from every direction, but is provided on two adjacent surfaces of the scintillation counter crystal 51 (see, for example, Patent Literature 1.) Such a construction allows position discrimination in the depth direction of the scintillator. As is apparent from FIG. 11, where the scintillator 52 is seen from a side end face, a number of the reflectors provided between the scintillation counter crystals is not always identical among each of the scintillation counter crystal layers.

[Patent Document 1]
Japanese Patent Publication No. 2004-279057

DISCLOSURE OF THE INVENTION

Problem to be Solved by the Invention

However, the conventional apparatus with such a construction has the following drawback. That is, a conventional radiation detector is set with no consideration as to have a different number of the reflectors provided in each of the scintillation counter crystal layers. In other words, in a conventional radiation detector, consideration for thickness of the reflector is not shown. An overall width in each of the scintillation counter crystal layers is preferably identical. Actually, however, the overall width may vary in accordance with a number of the reflectors provided in each of the scintillation counter crystal layers.

Specifically, suppose that four reflectors 53 are used in each of the scintillation counter crystal layers 52A and 52B (hereinafter referred to as a upper layer), and five reflectors 53 in each of the scintillation counter crystal layers 52C and 52D (hereinafter referred to as a lower layer), an overall width of the upper layer is narrower than that of the lower layer by a thickness d of one reflector 53, as exemplarily shown in FIG. 12. That is, the conventional scintillator has various scintillation counter crystal layers in overall width. Specifically, the upper layer is shifted with respect to the lower layer by da at a right end and by db at a left end in FIG. 12. Consequently, it becomes difficult to discriminate positions of fluorescence generated at a side end in the upper layer. Where an arrangement of the scintillation counter crystals forming the scintillator is shifted, fluorescence generated inside the scintillator enters into the PMT while spreading in accordance with the shift. As a result, positions of fluorescence entering into the PMT are to be shifted. Here, the sum of da and db corresponds to a thickness d of one reflector 53.

In general, it is difficult to discriminate positions of fluorescence generated on a side end face of the scintillator. When a scintillation counter crystal emitting fluorescence is located in a center of the scintillator, the fluorescence spreads within a range where the PMT may detect the fluorescence, and enters into the PMT coupled to the scintillator for detection there. However, fluorescence from the scintillation counter crystal at the side end of the scintillator also spreads to a side face of the scintillator where the PMT cannot detect the fluorescence, and may disperse therefrom. Then, fluorescence entering into the PMT has a reduced intensity. The PMT performs position discrimination of fluorescence generated from the side end of the scintillator with poor accuracy, which results in reduced spatial resolution. As noted above, in a conventional construction with no consideration of the reflector in thickness, fluorescence is reduced and a position of the incident fluorescence into the PMT also shifts. Consequently, only a radiation detector may be obtained with insufficient detection sensitivity and spatial resolution.

Moreover, the conventional construction has difficulty in stabilizing manufacture of a scintillator in a uniform shape. Upon manufacture of a scintillator, a side end face of the scintillator is pressed for joining each of the scintillation counter crystals to reflectors. Since the upper layers of the scintillator has reflectors fewer by one, scintillation counter crystals and reflectors are to be shifted toward a center. The shift varies in every manufacture of the scintillator. Specifically, upon pressure of the side face of the scintillator, the upper layer of the scintillator and the lower layer of the scintillator are shifted relative to each other by approximately halves of a thickness d of the reflector. An amount of the shift is not always constant, and thus only a scintillator with uneven quality is to be obtained according to the foregoing conventional construction.

Moreover, upon pressing of the side end face of the scintillator, the scintillation counter crystals close to the side end face of the scintillator are likely to be shifted to a larger extent. That is because shifting of the scintillation counter crystals located in the center of the scintillator is suppressed due to more reflectors. In other words, according to the foregoing conventional construction, only the scintillator may be obtained having a side end face thereof extremely bending. Considering from the side end of the scintillator with a reduced fluorescence intensity, the scintillator also has a side end with reduced spatial resolution.

This invention has been made regarding to the state of the art noted above, and its object is to provide a radiation detector having improved detection sensitivity and spatial resolution ability as well as a PET detector equipped with the radiation detector so as side end face of the scintillator to be flush.

Means for Solving the Problem

This invention is constituted as stated below to achieve the above object. That is, a radiation detector of this invention includes a scintillator to convert radiation emitted from a radiation source into fluorescence, and a fluorescence detection device to detect fluorescence from the scintillator. The scintillator is composed of scintillation counter crystal layers having scintillation counter crystals in a block shape arranged in two dimensions so as to be laminated in a direction toward the fluorescence detection device. The scintillation counter crystal layer has two or more first reflectors that are inserted between the scintillation counter crystals so as to be parallel to one another. The scintillation counter crystal layer also has two or more second reflectors that are perpendicular to the first reflectors and are inserted between the scintillation counter crystals so as to be parallel to one another. The scintillator has at least a first scintillation counter crystal layer and a second scintillation counter crystal layer having more first reflectors than the first scintillation counter crystal layer. A gap between the first reflectors adjacent to each other provided in the first scintillation counter crystal layer being wider than that between the first reflectors adjacent to each other provided in the second scintillation counter crystal layer such that an overall width of the first scintillation counter crystal layer in an arranging direction of the first reflectors is identical to an overall width the second scintillation counter crystal layer in the arranging direction.

According to the foregoing invention, a radiation detector may be provided with higher detection sensitivity and spatial resolution. Specifically, a scintillator having the radiation detector according to this invention has a multi-layer construction. The scintillator is composed of a scintillation counter crystal layer having more first reflectors parallel to one another and a scintillation counter crystal layer having fewer first reflectors parallel to one another. Moreover, the first reflectors adjacent to one another provided in the scintillation counter crystal layer having fewer first reflectors have gaps wider than that in the scintillation counter crystal layer having more first reflectors. As a result, an overall width of the first reflectors in each scintillation counter crystal layer in an arranging direction does not vary depending on a number the first reflectors. Thus, the scintillation counter crystal layers have a same overall width regardless of a number of the first reflectors, and each of the side end faces of the scintillator directed to each other is flush when seen as a whole of the scintillator. Consequently, the scintillation counter crystals forming the side end face of the scintillator are to be arranged in series in a direction toward a fluorescence detection device with no shift. That is, the scintillation counter crystals are arranged more accurately. According to this invention, even when radiation is converted into fluorescence in the scintillation counter crystals that form the side end face of the scintillator, a position of generating fluorescence may be discriminated closely. Therefore, a radiation detector may be provided having higher detection sensitivity and spatial resolution.

According to the foregoing construction, a radiation detector of more uniform quality may be provided. That is, upon manufacture of the scintillator according to this invention, even when the reflectors provided in one scintillation counter crystal layer are fewer than the reflectors provided in another scintillation counter crystal layer in a process of pressing the side end face of the scintillator, the scintillation counter crystals forming the scintillation counter crystal layer will not be shifted accordingly. Consequently, with this invention, positions of the scintillation counter crystals are the same in every manufacture of the scintillator, and scintillator of uniform quality may be manufactured.

The scintillator with the foregoing radiation detector has at least a third scintillation counter crystal layer and a fourth scintillation counter crystal layer having more second reflectors than the third scintillation counter crystal layer. A gap between the second reflectors adjacent to each other provided in the third scintillation counter crystal layer being wider than that between the second reflectors adjacent to each other provided in the fourth scintillation counter crystal layer such that an overall width of the third scintillation counter crystal layer in an arranging direction of the second reflectors is identical to an overall width the fourth scintillation counter crystal layer in the arranging direction.

With the foregoing construction, a radiation detector may be provided having higher detection sensitivity and spatial resolution. According to this construction, the scintillator is also suitable for position discrimination of fluorescence. That is, not only an overall width of the first reflectors in each of the scintillation counter crystal layers in an arranging direction, but also that of the second reflectors that intersect the first reflectors in an arranging direction is identical. Thus, each of four side end faces of the scintillator is to be flush. Consequently, even when fluorescence is generated from any of the side end faces of the scintillator, a position of generating fluorescence may be discriminated closely. Therefore, a radiation detector may be provided having higher detection sensitivity and spatial resolution.

Moreover, each of the first reflectors and second reflectors of the foregoing radiation detector preferably has two or more grooves formed along a direction toward the fluorescence detection device. Furthermore, the first reflectors and second reflectors are preferably integrated by fitting the grooves each provided in the first reflectors and second reflectors to form a reflector lattice frame.

According to the foregoing construction, a radiation detector having a scintillator of high quality may be provided more readily. As the foregoing construction, when the first reflectors and the second reflectors form the reflector lattice frame, support is given to the first reflectors and the second reflectors together. Consequently, each gap of the first reflectors adjacent to one another is fixed in a given width. Moreover, each gap of the second reflectors adjacent to one another is also fixed in a given width. Therefore, the scintillator with such a reflector lattice frame has uniform quality, thereby enhancing manufacturing yield. As a result, a radiation detector with a scintillator of low price and high quality may be provided.

In the foregoing radiation detector, four scintillation counter crystals are preferably inserted in each of sections divided by a reflector lattice of the reflector lattice frame.

According to the foregoing construction, position discrimination of fluorescence generated inside the scintillator may be ensured. Specifically, each of the scintillation counter crystals may have a suitable number of reflectors. Thus, a number of the reflectors to enclose scintillation counter crystals as well as positions where the reflectors are to be inserted may differ in each of the scintillation counter crystals arranged in series in a depth direction of the scintillator. That is, the surfaces of the scintillation counter crystals that are surrounded by the reflectors may differ in each of the scintillation counter crystals. Thus, when fluorescence emitted from the scintillation counter crystals enters into the PMT, intensity distributions of fluorescence differ from one another. As mentioned above, position discrimination in a depth direction of the scintillator may be performed more accurately, and a radiation detector having higher spatial resolution may be provided.

Moreover, in the first scintillation counter crystal layer of the above radiation detector, gaps of the first reflectors adjacent to one another are preferably gradually narrow as they go from one end side of the first reflectors toward the center of the scintillator, supposing that a gap between the first reflectors at one end on the side end face of the scintillator and the first reflectors adjacent to the first reflectors at the one end is a maximum.

According to the foregoing construction, a radiation detector may be provided having a scintillator more suitable for position discrimination. Specifically, in the first scintillation counter crystal layer, gaps of the first reflectors adjacent to one another are preferably gradually narrow as they go from one end side of the first reflectors toward the center of the scintillator, supposing that a gap of the first reflectors at one end on the side end face of the scintillator and the first reflectors adjacent to the first reflectors at the one end is maximum. With such a construction, the scintillation counter crystals in the center of the scintillator may be arranged accurately, and each of the side end faces of the scintillator may be flush. In general, a radiation detector has low detection sensitivity toward the side end of the scintillator. With the foregoing construction, the radiation detector may be provided having a scintillator with no side end thereof being of as low detection sensitivity as possible.

From a similar reason, in the third scintillation counter crystal layer, gaps of the second reflectors adjacent to one another are preferably gradually narrow as they go from one end side of the second reflectors toward the center of the scintillator, supposing that a gap of the second reflectors at one end on the side end face of the scintillator and the second reflectors adjacent to the second reflectors at the one end is a maximum.

Moreover, in the first scintillation counter crystal layer of the foregoing radiation detector, gaps of the first reflectors adjacent to one another may preferably be gradually wide as they go from one end side of the first reflectors toward the center of the scintillator, supposing that a gap of the first reflectors at one end on the side end face of the scintillator and the first reflectors adjacent to the first reflectors at the one end is a minimum.

Furthermore, in the third scintillation counter crystal layer of the foregoing radiation detector, gaps of the second reflectors adjacent to one another may preferably be gradually wide as they go from one end side of the second reflectors toward the center of the scintillator, supposing that a gap of the second reflectors at one end on the side end face of the scintillator and the second reflectors adjacent to the second reflectors at the one end is a minimum.

Moreover, the foregoing radiation detector may have the first reflectors adjacent to one another with a uniform gap in the first scintillation counter crystal layer.

Moreover, the foregoing radiation detector may have the second reflectors adjacent to one another with a uniform gap in the third scintillation counter crystal layer.

It is more preferable to provide a transparent material that allows fluorescence to pass through so as to surround each of the scintillation counter crystals that forms the foregoing scintillator.

According to the construction, a radiation detector may be provided having a scintillator more suitable for discrimination position of generating fluorescence. In the foregoing construction, one of the reflector and the transparent material is provided between the scintillation counter crystals adjacent to each other. With such a configuration, the scintillation counter crystals may be optically coupled to one another in a direction where fluorescence disperses. With such a configuration, fluorescence that travels across the adjacent scintillation counter crystals may be introduced into the PMT without being reduced as much as possible. Therefore, the radiation detector may be provided having improved detection sensitivity and resolution.

Moreover, tomography equipment according to this invention includes a detector ring to generate radiation detection data with the above radiation detector being arranged in a ring shape, a coincidence device to perform coincidence of the radiation detector data, a fluorescence generating position discrimination device to discriminate a position of generating fluorescence in the detector ring, and an image formation device to receive analytical data sent from the fluorescence generating position discrimination device to form a sectional image of a subject.

According to the foregoing construction, tomography equipment may be provided that may derive generating positions of annihilation gamma ray-pairs more accurately. Each of the side end faces of the scintillator according to this invention is flush that are directed to each other. That is, the scintillation counter crystals on the side end face of the scintillator may be arranged accurately. Therefore, when such a scintillator is arranged in the tomography equipment, the tomography equipment has increased spatial resolution. Thus, the tomography equipment may be provided that is capable of forming sectional images with localization of radiopharmaceutical in the subject being reproduced therein more closely.

Effect of the Invention

With the radiation detector according to this invention and the tomography equipment provided therewith, the construction may be provided having high detection sensitivity and spatial resolution. The scintillator according to this invention is formed of a scintillation counter crystal layer having more reflectors parallel to one another and a scintillation counter crystal layer having fewer reflectors parallel to one another. Moreover, the reflectors adjacent to one another provided in the scintillation counter crystal layer with fewer reflectors have a gap wider than that in the scintillation counter crystal layer with more reflectors. As a result, an overall width of the reflectors in each scintillation counter crystal layer in an arranging direction does not vary depending on a number of the reflectors. Thus, the scintillation counter crystal layers have a uniform overall width regardless of a number of the reflectors, and each of the side end faces of the scintillator directed to each other is flush when seen as a whole of the scintillator. Consequently, the scintillation counter crystals forming the side end face of the scintillator are to be arranged in series in a direction toward the fluorescence detection device with no shift. That is, the scintillation counter crystals on the side end face of the scintillator may be arranged accurately. According to this invention, even when radiation is converted into fluorescence in the side end face of the scintillator, a position of generating fluorescence may be discriminated closely. Therefore, a radiation detector may be provided having higher detection sensitivity and spatial resolution. Therefore, when such a radiation detector according to this invention is arranged in the tomography equipment, the tomography equipment has increased spatial resolution. Thus, the tomography equipment may be provided that is capable of forming sectional images with localization of radiopharmaceutical in the subject being reproduced therein more closely.

BRIEF DESCRIPTION OF THE DRAWINGS

FIG. 2 is a plan view of a scintillator according to Embodiment 1 seen from zx-side end face thereof;

FIG. 6 is a plan view showing gaps of the first reflectors according to Embodiment 1;

FIG. 7 is a plan view showing gaps of the second reflectors according to Embodiment 1;

FIG. 8 is a plan view showing processes of discriminating fluorescence generating positions in z-direction of the radiation detector according to Embodiment 1;

FIG. 10 is a plan view showing gaps of first reflectors according to one modification;

Figure 1:
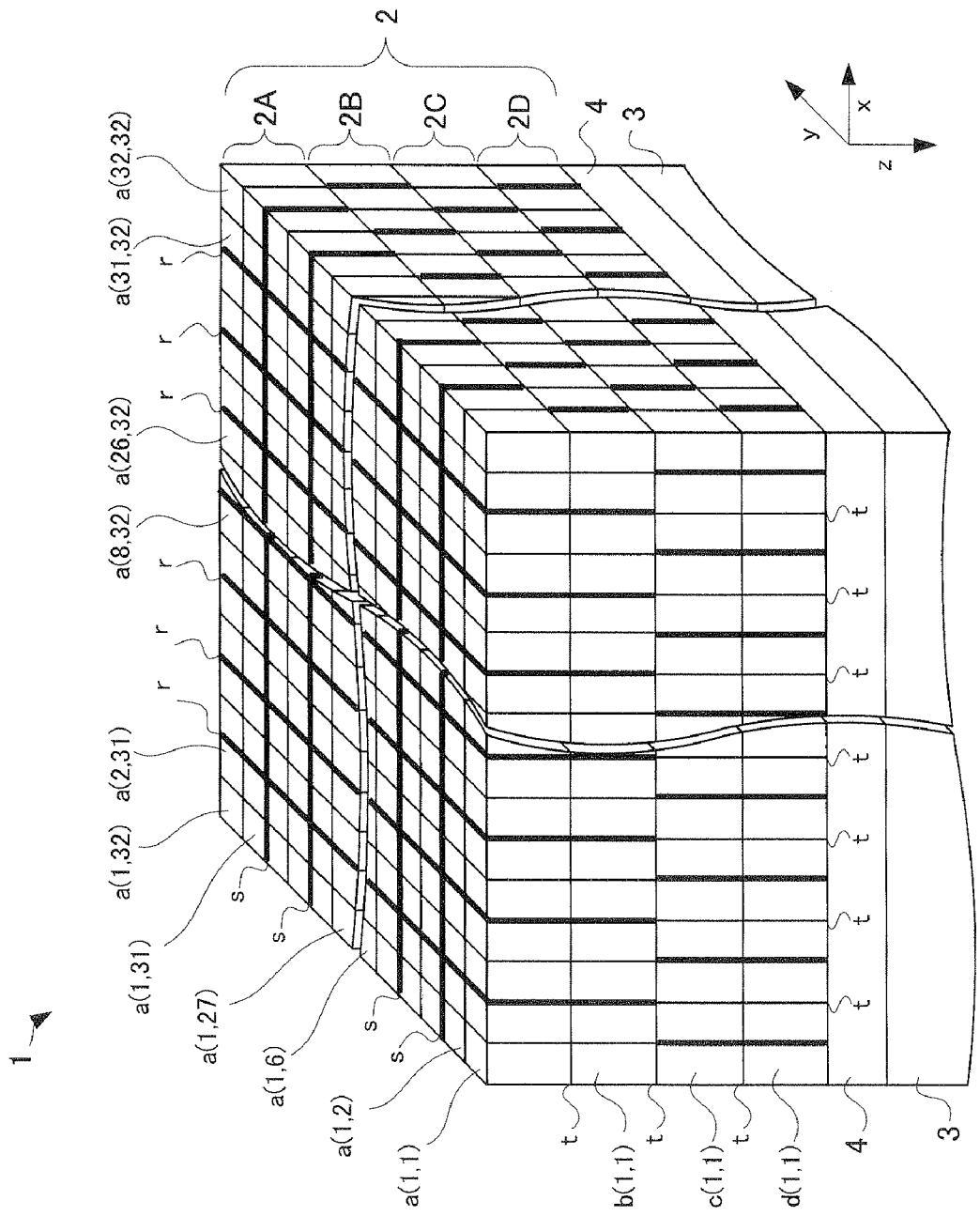
FIG. 1 is a perspective view of a radiation detector according to Embodiment 1.

DESCRIPTION OF REFERENCES 1 radiation detector
2 scintillator
3 PMT (fluorescence detection device)
5, 6 groove
7 reflector lattice frame
10 PET device (tomography equipment)
12 detector ring
20 coincidence unit (coincidence device)
21 fluorescence position discrimination unit (fluorescence position discrimination device)
22 absorption correction unit (absorption correction device)

BEST MODE FOR CARRYING OUT THE INVENTION

Embodiments of a radiation detector according to this invention and tomography equipment provided therewith will be described hereinafter with reference to the drawings.

Embodiment 1

Firstly, description will be given to a construction of a radiation detector according to Embodiment 1. FIG. 1 is a perspective view of the radiation detector according to Embodiment 1. As shown in FIG. 1, the radiation detector 1 according to Embodiment 1 includes a scintillator 2 that is formed of scintillation counter crystal layers each laminated in order of a scintillation counter crystal layer 2A, a scintillation counter crystal layer 2B, a scintillation counter crystal layer 2C, and a scintillation counter crystal layer 2D in a z-direction, a photomultiplier tube (hereinafter referred to as PMT) 3 that is provided on an undersurface of the scintillator 2 for detecting fluorescence emitted from the scintillator, and a light guide 4 interposed between the scintillator 2 and the PMT 3. Consequently, each of the scintillation counter crystal layers is laminated in a direction toward the PMT 3. Here, the scintillation counter crystal layer 2A corresponds to an incident surface of radiation in the scintillator 2. Each of the scintillation counter crystal layers 2A, 2B, 2C, and 2D is optically coupled, and includes a transparent material t between each of the layers. The transparent material t passes through fluorescence generated in the scintillation counter crystal layers to guide the fluorescence into the PMT 3. The transparent material t also joins the scintillation counter crystals adjacent to one another in the z-direct on. A thermosetting resin composed of a silicone resin may be used for the transparent material t. The scintillation counter crystal layer 2A corresponds to a receiver of the gamma rays emitted from a radioactive source. The scintillation counter crystals in a block shape are arranged in a two-dimensional array with thirty-two numbers of the scintillation counter crystals in an x-direction and thirty-two numbers of the scintillation counter crystals in a y-direction relative to a scintillation counter crystal a (1, 1). That is, the scintillation counter crystals from a (1, 1) to a (1, 32) are arranged in the y-direction to form a scintillator crystal array. Thirty-two numbers of the scintillator crystal arrays are arranged in the x-direction to form a scintillation counter crystal layer 2A. Here, as for the scintillation counter crystal layers 2B, 2C, and 2D, thirty-two numbers of the scintillator counter crystals are also arranged in the x-direction and the y-direction in a matrix in a two-dimensional array relative to a scintillation counter crystal b (1, 1), c (1, 1), and d (1, 1), respectively. In each of the scintillation counter crystal layers 2A, 2B, 2C, and 2D, the transparent material t is also provided between the scintillation counter crystals adjacent to each other. Consequently, each of the scintillation counter crystals is to be enclosed with the transparent material t. The transparent material t has a thickness around 25 μm. Here, the PMT and gamma rays correspond to the fluorescence detection device and radiation, respectively, in this invention.

The scintillator 2 has scintillation counter crystals suitable for detection of gamma rays in a three-dimensional array. That is, the scintillation counter crystal is composed of Ce-doped $Lu_{2(1-X)}Y_2XSiO_5$ (hereinafter referred to as LYSO.) Each of the scintillation counter crystals is, for example, a parallelepiped having a width of 1.45 mm in the x-direction, a width of 1.45 mm in the y-direction, and a height of 4.5 mm regardless of the scintillation counter crystal layer. The scintillator 2 has four side end faces that are covered with a reflective film not shown. The PMT 3 is multi-anode type, and allows position discrimination of incident fluorescence in the x and y.

The light guide 4 is provided for guiding fluorescence generated in the scintillation 2 into the PMT 3. Consequently, the light guide 4 is optically coupled to the scintillator 2 and the PMT 3.

As shown in FIG. 1, the first reflectors r and the second reflectors s that are formed of plastic films, such as a polyester film, and has a thickness of 125 μm are provided in a position interposed between the scintillation counter crystals adjacent to one another. Firstly, description will be given to the first reflectors r. FIG. 2 is a plan view of the scintillator according to Embodiment 1 when seen from the zx-side end face thereof. As shown in FIG. 2, any first reflector r is plate-like and extends in the x-direction and z-direction. The height in the z-direction is set, for example, at 4.5 mm. Directing attention to the scintillation counter crystal layer 2B, fifteen numbers of the first reflectors from rb1 to rb15 are provided, and are parallel to one another. The first reflection rb1 is inserted between, for example, b (2,1) and b (3,1) among thirty-two numbers of the scintillation counter crystals arranged in the x-direction. Specifically, scintillation counter crystals of even numbers in the x-direction are arranged on a left hand of the first reflectors rb, and those of odd numbers in the x-direction on a right hand of the first reflectors rb. Here, the scintillation counter crystal layer 2B corresponds to the first scintillation counter crystal layer in this invention. Moreover, the inserting position of the first reflectors ra in the scintillation counter crystal layer 2A is the same as that in the scintillation counter crystal layer 2B.

Now attention to the scintillation counter crystal layer 2C, sixteen numbers of the first reflectors rc from rc1 to rc16 are provided, and are parallel to one another. Thus, the first reflectors rc in the scintillation counter crystal layer 2C are more than the first reflectors rb in the scintillation counter crystal layer 2B by one in number. The scintillation counter crystal layer 2C corresponds to the second scintillation counter crystal layer having more first reflectors in number than the first scintillation counter crystal layer. In the scintillation counter crystal layer 2C, the first reflector is inserted between, for example, c (1, 1) and c (2, 1) among thirty-two numbers of the scintillation counter crystals arranged in the x-direction. Specifically, scintillation counter crystals of odd numbers are arranged in the x-direction on a left hand of the first reflectors rb, and those of even numbers in the x-direction on a right hand of the first reflectors rb. Moreover, the inserting position of the first reflectors rd in the scintillation counter crystal layer 2D is the same as that in the scintillation counter crystal layer 2C.

Figure 3:
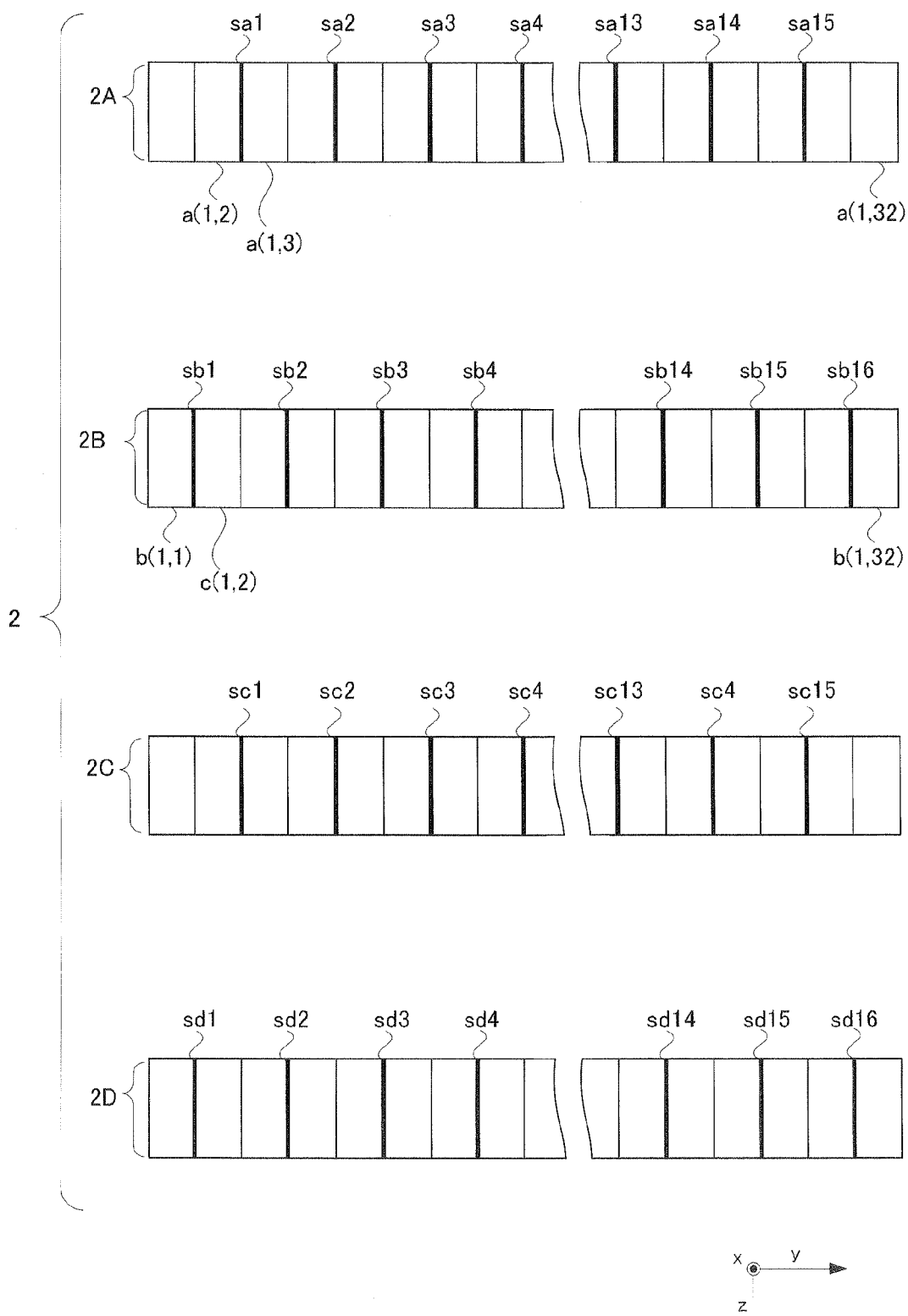
FIG. 3 is a plan view of the scintillator according to Embodiment 1 seen from yz-side end face thereof.

Next, description will be given to the yz-side end face having the scintillator according to this embodiment. FIG. 3 is a plan view of the scintillator according to Embodiment 1 when seen from the yz-side end face thereof. As shown in FIG. 3, the second reflectors s are provided in each of the scintillation counter crystal layers. Every second reflector s is plate-like and extends in the y-direction and z-direction. The height in the z-direction is set, for example, at 4.5 mm. Directing attention to the scintillation counter crystal layer 2A, fifteen numbers of the second reflectors from sa1 to sa15 are provided, and are parallel to one another. The second reflector sa1 is inserted between, for example, the scintillator crystal a (1, 2) and the scintillator crystal a (1, 3) among thirty-two numbers of the scintillation counter crystals arranged in the x-direction. Specifically, scintillation counter crystals of even numbers are arranged in the y-direction on a left hand of the second reflectors sa, and scintillation counter crystals of odd numbers in the y-direction on a right hand of the second reflectors sa. Here, the scintillation counter crystal layer 2A corresponds to the third scintillation counter crystal layer in this invention. Moreover, the inserting position of the second reflectors sc in the scintillation counter crystal layer 2C is the same as that in the scintillation counter crystal layer 2A.

Here, directing attention to the scintillation counter crystal layer 2B, sixteen numbers of the second reflectors sb from sb1 to sb16 are provided, and are parallel to one another. Thus, the second reflectors sb in the scintillation counter crystal layer 2B are more than the second reflectors sa in the scintillation counter crystal layer 2A by one in number. The scintillation counter crystal layer 2B corresponds to the fourth scintillation counter crystal layer having more second reflectors in number than the third scintillation counter crystal layer. In the scintillation counter crystal layer 2B, the second reflector sb is inserted between, for example, a scintillation counter crystal b (1, 1) and a scintillation counter crystal b (2, 1) among thirty-two numbers of the scintillation counter crystals arranged in the y-direction. Specifically, scintillation counter crystals of odd numbers are arranged in the y-direction on a left hand of the second reflectors sb, and scintillation counter crystals of even numbers in the y-direction on a right hand of the second reflectors sb. Moreover, the inserting position of the second reflectors in the scintillation counter crystal layer 2D is the same as that in the scintillation counter crystal layer 2B.

Figure 4:
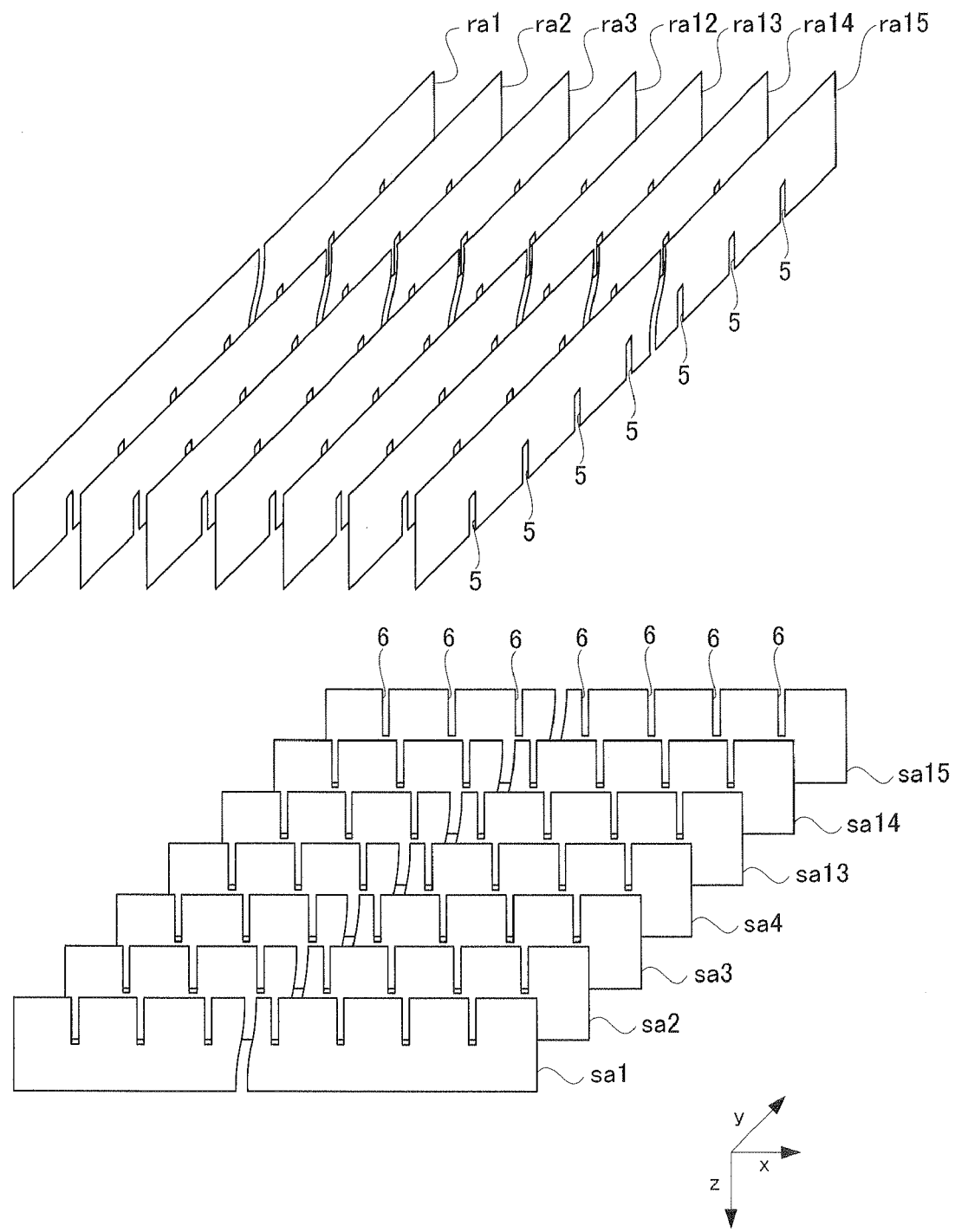
FIG. 4 is an exploded perspective view showing a construction of a reflector lattice formed by first reflectors and the second reflectors according to Embodiment 1.
Figure 5:
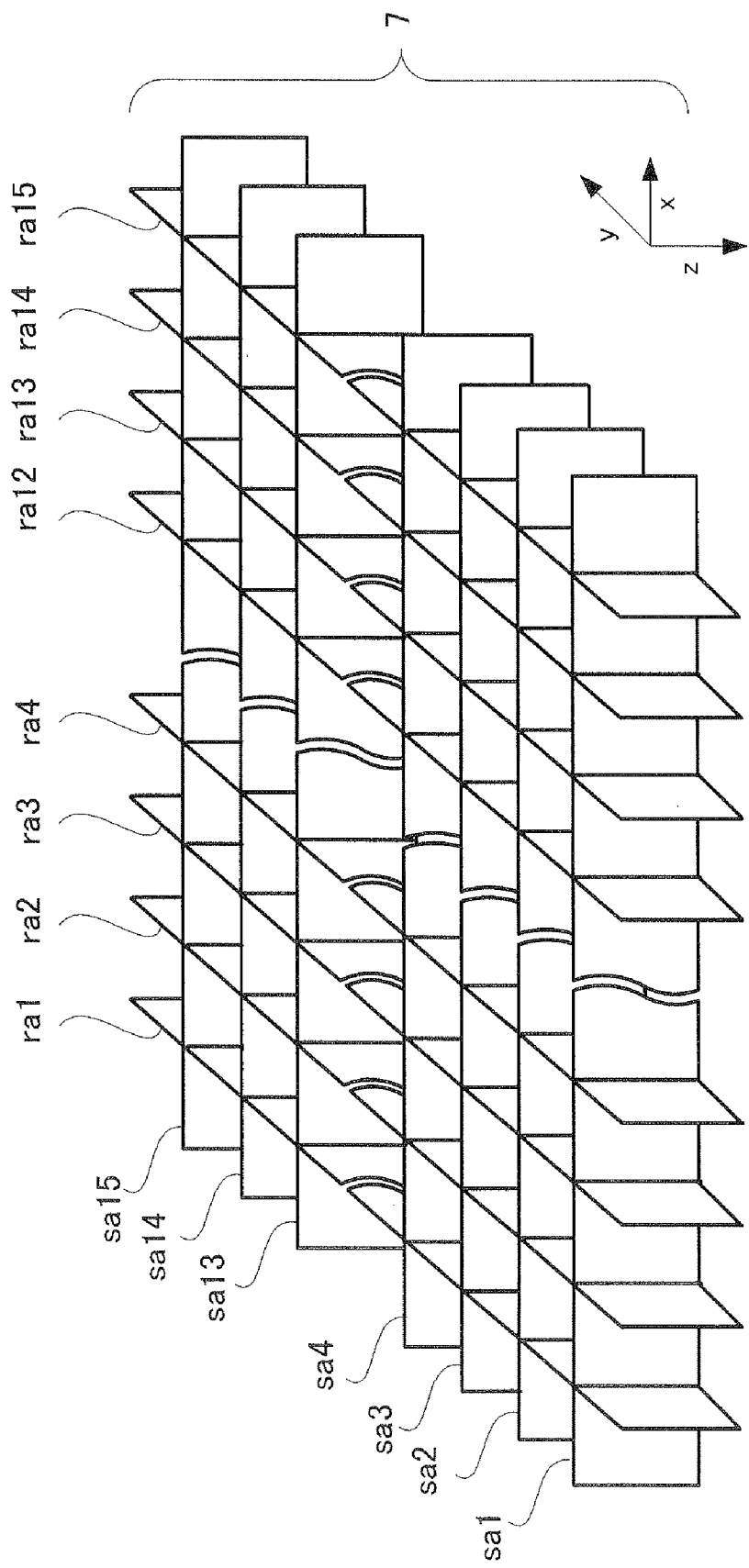
FIG. 5 is a perspective view showing a construction of a reflector lattice formed by first reflectors and the second reflectors according to Embodiment 1.

Next, description will be given to constructions of the first reflectors r and the second reflectors s provided in each of the scintillation counter crystal layer. FIGS. 4 and 5 are perspective views each showing a construction of a reflector lattice formed by first reflectors and the second reflectors according to Embodiment 1. Here, a construction of the scintillation counter crystal layer 2A is to be described as an example. Other scintillation counter crystal layers 2B, 2C, and 2D have a similar reflector lattice in construction. As shown in FIG. 4, the first reflectors ra and the second reflectors sa are perpendicular to each other. Grooves 5 are formed in the first reflectors ra that extend downward in the z-direction. Grooves 6 are formed in the second reflectors sa that extend upward in the z-direction. The first reflectors ra and the second reflectors sa are integrated by fitting the grooves 5 and grooves 6 to form a reflector lattice frame 7, as shown in FIG. 5. Moreover, four scintillation counter crystals arranged in a matrix in a two-dimensional array are inserted in each of sections divided by the reflector lattice frame 7. Therefore, the reflector lattice frame 7 supports each of the scintillation counter crystals. Moreover, the first reflectors ra are each perpendicular to the second reflectors sa. Thus, gaps of the first reflectors ra adjacent to one another are determined in accordance with distances of the grooves 6 provided in the second reflectors sa. In contrast, the second reflectors sa are each perpendicular to the first reflectors ra. Thus, gaps of the second reflectors sa adjacent to one another are determined in accordance with distances of the grooves 5 provided in the first reflectors ra.

The number of grooves 5 provided in the first reflectors ra is the same as the number of the second reflectors sa arranged in the scintillation counter crystal layer 2A. In contrast, the number of grooves 6 provided in the second reflectors sa is the same as the number of the first reflectors ra arranged in the scintillation counter crystal layer 2A. The sum of lengths of the grooves 5 and grooves 6 in the z-direction corresponds to heights of both reflectors ra and sa in the z-direction. The lengths of grooves 5 and grooves 6 are preferably of one-half of the heights of both reflectors ra and sa in the z-direction.

Further description will be given to the construction of the first reflectors. Gaps of the first reflectors adjacent to one another have the most characteristic configuration in this embodiment. FIG. 6 is a plan view showing the gaps of the first reflectors according to Embodiment 1. As shown in FIG. 6(a), the scintillation counter crystal layer 2B has fifteen numbers of the first reflectors rb. Thus, considering of sixteen numbers of the first reflectors rc, the scintillation counter crystal layer 2C has fewer first reflectors r by one in number than the reflectors rc. There are to be fourteen gaps of the first reflectors rb adjacent to one another in the scintillation counter crystal layer 2B. The gaps of the first reflectors rb adjacent to one another are gradually wide as they go from the first reflector rb1 toward the center of the scintillator, supposing that a gap m+Δ1 of the first reflectors rb1 closest to one end on the side end face of the scintillator and the first reflectors rb2 adjacent thereto is a maximum. That is, it is assumed that a gap between the first reflector rb1 and the first reflector rb2 is m+Δ1, a gap m+Δ2 between the first reflector rb2 and the first reflector rb3 is narrower than the gap m+Δ1. Moreover, a gap m+Δ3 between the first reflector rb3 and the first reflector rb4 is much narrower than the gap m+Δ2. Consequently, the gaps of the first reflectors adjacent to one another are gradually narrow as they go toward the center. A gap between the first reflector rb8 closest to the center among the first reflectors rb and the first reflector rb7 adjacent thereto is a minimum m. The gaps of the first reflectors adjacent to one another are gradually wide as they go therefrom toward the other end on the side end face in the scintillator 2. A gap between the first reflector rb14 and the first reflector rb15 is again to be a maximum m+Δ1. That is, arrangement of the first reflectors rb1 to the first reflector rb15 is axial symmetric with respect to the first reflector rb8. Here, the scintillation counter crystal layer 2A in Embodiment 1 has the same construction as above.

On the other hand, there are fifteen gaps of the first reflectors rc adjacent to one another in the scintillation counter crystal layer 2C. As shown in FIG. 6(b), gaps of the first reflectors rc adjacent to one another are identical (for example, n) over the scintillation counter crystal layer 2C. The scintillation counter crystal layer 2D in Embodiment 1 has the same construction as above.

Thus, the first reflectors rb in the scintillation counter crystal layer 2B is fewer in number than that in the scintillation counter crystal layer 2C. The gaps of the first reflectors rb in scintillation counter crystal layer 2B adjacent to one another are wider than those in the scintillation counter crystal layer 2C. Moreover, the first reflectors in both of the scintillation counter crystal layers 2B and 2C has a uniform overall width in the arranging direction (x-direction in FIG. 1). Specifically, the first reflectors rb adjacent to one another in scintillation counter crystal layer 2B are assumed to be of gap n. The overall width of the first reflectors r in the scintillation counter crystal layer 2B is smaller than that in the scintillation counter crystal layer 2C by a thickness of one first reflector r. However, with the construction of the scintillator 2 according to Embodiment 1, the first reflectors rb in the scintillation counter crystal layer 2B are determined to have wider gaps of the first reflectors r adjacent to one another so as to compensate the thickness of one first reflector r. There are fifteen numbers of the first reflectors rb provided between both of the scintillation counter crystals b (1, 1) and b (32, 1) on opposite ends of the scintillation counter crystal layer 2B. Since the gaps of the first reflectors rb adjacent to one another are set to be wide, the distance between the scintillation counter crystals b (1, 1) and b (32, 1) is equivalent to that having sixteen numbers of the first reflectors r provided therein. Thus, considering of sixteen numbers of the first reflectors rc provided between the scintillation counter crystals c (1, 1) and c (32, 1) on opposite ends of the scintillation counter crystal layer 2C, the scintillation counter crystal layer 2C has the same distance as that between the scintillation counter crystals b (1, 1) and b (32, 1).

Considering that the first reflectors rb in the scintillation counter crystal layer 2B are determined to have wider gaps of the first reflectors rb adjacent to one another so as to compensate the thickness of one first reflector rb, the gaps between the scintillation counter crystals adjacent to one another are to be wide by an amount of expansion of the overall width of the scintillation counter crystal layer 2B (by a thickness of the first reflectors r). In this regard, according to the configuration of Embodiment 1, the gaps of the scintillation counter crystals between the scintillation counter crystals b(1,1) and b(32,1) gradually expand, and the sum of an expanded amount in each gap corresponds to a thickness of one first reflectors r.

Next, description will be given to the second reflectors s. FIG. 7 is a plan view showing gaps of the second reflectors according to Embodiment 1. The gaps of the second reflectors s adjacent to one another are similar to those of the first reflectors r. Specifically, as shown in FIG. 7(a), the gaps of the second reflectors sa adjacent to one another are gradually narrow as they go from the second reflector sa1 toward the center of the scintillator 2, supposing that a gap p+ϵ1 of the second reflectors sa1 closest to one end on the side end face of the scintillator and the second reflectors sa2 adjacent thereto is maximum. That is, it is assumed that a gap between the second reflector sa1 and the second reflector sa2 is p+ϵ1, a gap p+ϵ2 between the second reflector sa2 and the second reflector sa3 is narrower than the gap p+ϵ1. Moreover, a gap p+ϵ3 between the second reflector sa3 and the second reflector sa4 is much narrower than the gap p+ϵ2. Consequently, the gaps of the second reflectors sa adjacent to one another are gradually narrow as they go toward the center. A gap between the second reflector sa8 closest to the center among the second reflectors sa and the second reflector sa1 adjacent thereto is a minimum p. The gaps of the second reflectors adjacent to one another are gradually wide as they go therefrom toward the other end on the side end face in the scintillator. A gap between the second reflector sa14 and the second reflector sa15 is again to be a maximum p+ϵ1. That is, arrangement of the second reflectors sa1 to the second reflector sa15 is axial symmetric with respect to the second reflector rb8. Here, the scintillation counter crystal layer 2C in Embodiment 1 has the same construction as above.

On the other hand, there are fifteen gaps of the second reflectors sb adjacent to one another in the scintillation counter crystal layer 2B having more second reflectors s in number. As shown in FIG. 7(b), gaps of the second reflectors sb adjacent to one another are identical (for example, q) over the scintillation counter crystal layer 2B. The scintillation counter crystal layer 2D in Embodiment 1 has the same construction as above.

Moreover, the second reflectors s in both the scintillation counter crystal layers 2A and 2B has a uniform overall width in the arranging direction (y-direction in FIG. 1.) That is, with the construction of the scintillator 2 according to Embodiment 1, the second reflectors sa in the scintillation counter crystal layer 2A are determined to have wider gaps of the second reflectors sa adjacent to one another so as to compensate a thickness of one second reflector s. Consequently, even when each of scintillation counter crystal layers has various numbers of the second reflectors s, the overall width of the scintillation counter crystal layer 2A in the y-direction having fewer second reflectors s in number is compensated for a thickness of one second reflector s. Thus, the overall width of each scintillation counter crystal layer in the y-direction is identical regardless of a number of the second reflectors s. Specifically, the first reflectors sa adjacent to one another in scintillation counter crystal layer 2A are assumed to be of gap q. The overall width of the first reflectors sa in the scintillation counter crystal layer 2A is narrower than that in the scintillation counter crystal layer 2B by a thickness of one second reflector s due to fewer second reflectors s by one in number. However, with the construction of the scintillator 2 according to Embodiment 1, the second reflectors sa in the scintillation counter crystal layer 2A are determined to have wider gaps of the second reflectors sa adjacent to one another so as to compensate the thickness of one second reflector s.

The above description has been given to only relation between the first reflectors and the scintillation counter crystals on opposite ends of the scintillation counter crystal layer. It is also applicable to the second reflectors by replacing numeral numbers. Here, replacement is to be made of the scintillation counter crystal layer 2B, first reflector r, scintillation counter crystal b (1, 1), scintillation counter crystal b (32, 1), scintillation counter crystal layer 2C, scintillation counter crystal c (1, 1), scintillation counter crystal c (32, 1), and x-direction with the scintillation counter crystal layer 2A, second reflector s, scintillation counter crystal a (1, 1), scintillation counter crystal a (1, 32), scintillation counter crystal layer 2B, scintillation counter crystal b (1, 1), scintillation counter crystal b (1, 32), and y-direction, respectively.

Next, description will be given to processes of discriminating fluorescence generating positions in x-, y-, and z-directions in the radiation detector 1 according to Embodiment 1. Incident gamma rays into the scintillator 2 are converted into fluorescence in either of the scintillation counter crystal layers 2A, 2B, 2C, and 2D that forms the scintillator 2. The fluorescence travels in a direction toward the light guide 4, and then enters into the PMT 3 through the light guide 4. The PMT 3 is multi-anode type, and allows voltages of the detection signals to be outputted to vary gradually in accordance with incident positions. Consequently, position discrimination of incident fluorescence into the PMT 3 in x- and y-directions may be performed.

FIG. 8 is a plan view showing processes of discriminating fluorescence generating positions in z-direction in the radiation detector according to Embodiment 1. As shown in FIG. 8, each of the scintillation counter crystal layers 2A, 2B, 2C, and 2D that forms the scintillator 2 differs from one another in inserting positions of the first reflectors r and the second reflectors s. FIG. 8 shows a portion of the scintillator 2 according to Embodiment 1, and (a), (b), (c) and (d) in the drawing illustrate constructions of the scintillation counter crystal layers 2A, 2B, 2C, and 2D, respectively. Directing attention to the scintillation counter crystals a (2, 2), b (2, 2), c (2, 2), and d (2, 2) on (2, 2), all of the four have two sides adjacent to each other that are covered with the reflectors. The scintillation counter crystals on (2, 2) differ from one another in direction where the reflectors are provided. Thus, four scintillation counter crystals that are identical to one another in the xy-positions have different optical conditions. The fluorescence generated in the scintillation counter crystal reaches the PMT 3 while spreading in the xy-directions. Providing the reflectors leads to addition of directivity to the spreading. Moreover, comparing fluorescence generated in the four scintillation counter crystals having the same xy positions, they differ from each other in direction of spreading. That is, differences in the positions of generating fluorescence in the z-direction in the scintillator 2 are to be converted into differences of fluorescence in the xy-directions. The PMT 3 may detect a slight deviation of the fluorescence in the xy-directions due to the differences in the position in the z-direction, and may calculate the position of generating fluorescence in the z-direction from it.

As noted above, a radiation detector 1 according to Embodiment 1 may be provided with higher gamma-ray detection sensitivity and spatial resolution. The scintillator 2 is composed of the scintillation counter crystal layer having more reflectors in number and the scintillation counter crystal layer having fewer reflectors in number. Moreover, in the arranging direction of the reflectors, the reflectors adjacent to one another provided in the scintillation counter crystal layer with fewer reflectors have gaps wider than those in the scintillation counter crystal layer with more reflectors. As a result, an overall width of the reflectors in each scintillation counter crystal layer in the arranging direction does not vary depending on a number of the reflectors provided therein. Thus, the scintillation counter crystal layers have a uniform overall width regardless of a number of the reflectors, and the four side end faces of the scintillator are flush when seen as a whole of the scintillator. Here, the side end of the scintillator 2 has low detecting sensitivity. That is because, a part of fluorescence generated from the scintillation counter crystals may disperse from the side end face of the scintillator 2. According to the Embodiment 1, even when fluorescence is generated at the side end of the scintillator 2, a position of generating fluorescence may readily be discriminated, since each of the scintillation counter crystals that forms four side end faces of the scintillator 2 is arranged in the z-direction more regularly. Accordingly, a radiation detector may be provided with higher detection sensitivity and spatial resolution. Moreover, each gap of the reflectors adjacent to one another is determined on purpose. Thus, even when the overall width of the scintillation counter crystal layer expands, a width of the gaps between the scintillation counter crystals that expands accordingly does not gather at a portion of the scintillation counter crystal layer but is distributed to the entire scintillation counter crystal layer. Consequently, the arrays of the scintillation counter crystals forming the scintillator 2 are connected in series along the z-direction, and are hardly shifted. Therefore, the radiation detector according to Embodiment 1 has high spatial resolution also in portions other than the side end of the scintillator 2.

Embodiment 2

Figure 9:
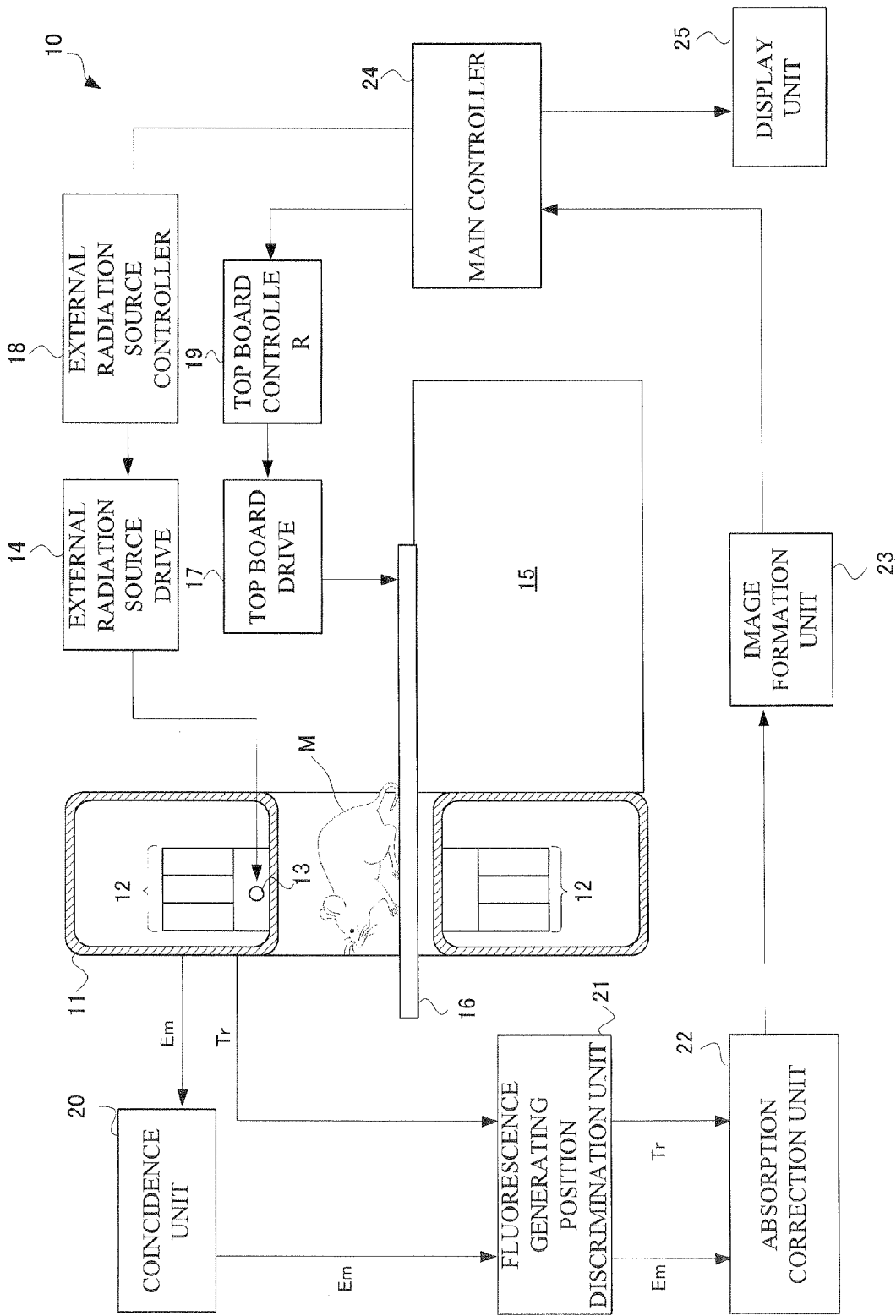
FIG. 9 is a functional block diagram showing a construction of a PET device according to Embodiment 2.
Figure 11:
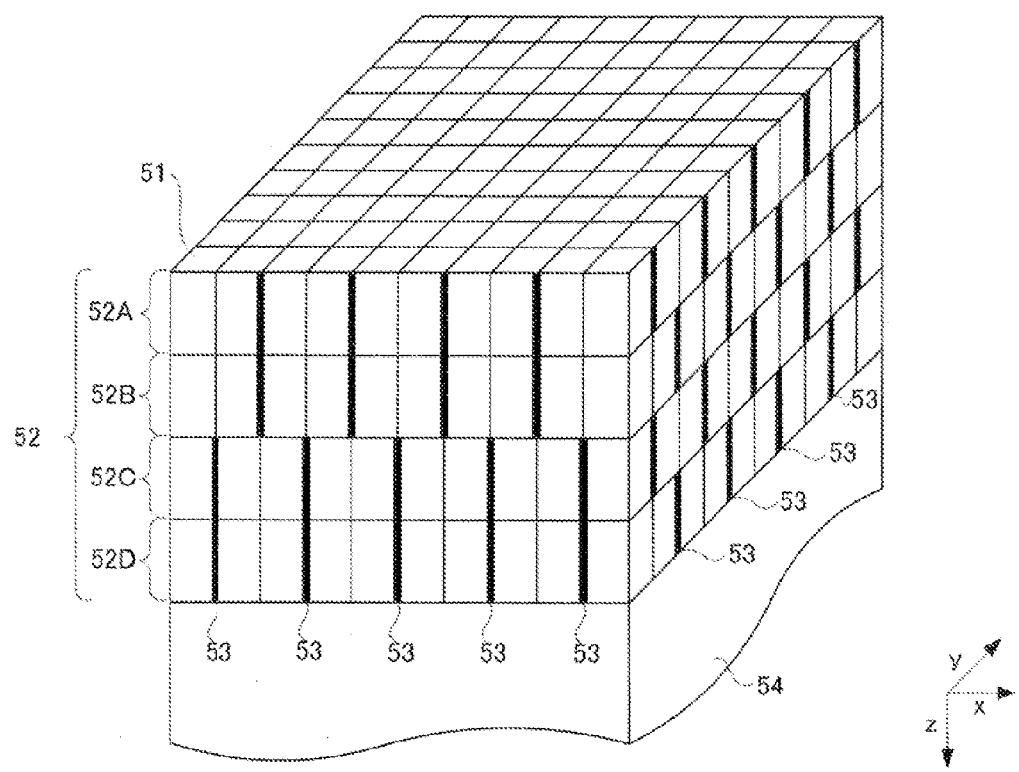
FIG. 11 is a perspective view showing a construction of a conventional radiation detector.
Figure 12:
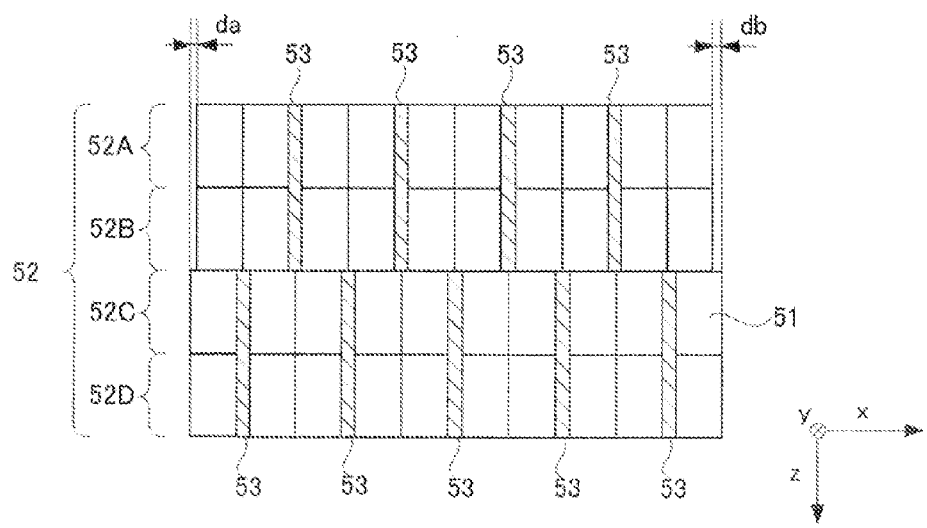
FIG. 12 is a plan view showing the construction of the conventional radiation detector.

Next, description will be given to tomography equipment (hereinafter referred to as a PET device) provided with the radiation detector described in Embodiment 1. FIG. 9 is a functional block diagram showing a construction of a PET device according to Embodiment 2. As shown in FIG. 9, the PET device 10 according to Embodiment 2 includes a gantry 11, a detector ring 12 provided inside the gantry 11, a gamma-ray point source 13 provided on an inner surface side of the detector ring 12 for applying fan beams of gamma rays and a gamma-ray point source drive 14 for driving thereof, a bed 15 provided with a top board 16 to mount small animals such as a mouse (hereinafter referred to as a subject M), and a top board drive 17 to slide the top board 16. Here, the gamma-ray point source drive 14 is controlled under a gamma-ray point source controller 18. The top board drive 17 is controlled under a top board controller 19. The PET device 10 further includes each unit for obtaining sectional images of the subject M. Specifically, the PET device 10 includes a coincidence unit 20 to receive gamma ray detection signals showing a detection position, detection strength, and detection time of gamma rays from the detector ring 12 for performing coincidence of an annihilation gamma ray-pair, a fluorescence generating position discrimination unit 21 to discriminate an incident position of gamma rays in the detector ring 12 based on two pieces of gamma ray detection data determined to be an annihilation-gamma-rays pair in the coincidence unit 20, an absorption correction unit 22 to perform absorption correction of gamma rays with reference to transmission data mentioned later, and an image formation unit 23 to form a PET image of the subject M.

The PET device 10 according to Embodiment 2 further includes a main controller 24 to control each of the controllers 18 and 19 en bloc, and a display unit 25 to display the PET image. The main controller 24 is formed of a CPU, and performs execution of various programs to realize each of the controllers 18 and 19 and coincidence unit 20, the fluorescence generating position discrimination unit 21, the absorption correction unit 22, and the image formation unit 23. Here, the coincidence unit 20, the fluorescence generating position discrimination unit 21, and the image formation unit 23 correspond to the coincidence device, the fluorescence generating position discrimination device, and the image formation device, respectively, in this invention.

Description will be given to operations of the PET device according to Embodiment 2 with reference to FIG. 9. Upon conducting of examinations with the PET device 10 according to Embodiment 2, firstly the subject M is laid on the top board 16 with radiopharmaceutical being administered thereto by injection in advance. Next, the top board 16 slides to bring the subject M into the gantry 11, and thereafter transmission data showing absorption distributions of gamma rays within the subject M is obtained. Specifically, beams of gamma rays in a fan shape are applied from the gamma-ray point source 13 towards the subject M. The gamma ray beams will pass through the subject M to be detected with the detector ring 12. Such detection is performed throughout the periphery of the subject M while rotating the gamma-ray point source 13 along the inner surface of the detector ring 12, whereby an absorption map of gamma rays in the section of the subject M is obtained. Then, the top board 16 slides again to repeat obtaining of the above gamma ray absorption-coefficient map at every change of a position of the subject M sequentially. As noted above, the gamma ray absorption coefficient map on the entire subject M is to be obtained.

Following obtaining of the transmission data as mentioned above, emission data is obtained to detect the annihilation-gamma-rays pair that is emitted from the radiopharmaceutical administered to the subject M. Prior to this, the gamma-ray point source 13 obstructive of obtaining the emission data is moved in a direction of the body axis of the subject M for storage thereof into a radiation source screen unit not shown.

Thereafter, emission data is obtained. Specifically, the detector ring 12 detects an annihilation gamma-rays pair that is emitted from the inside of the subject M having traveling directions opposite by 180 degrees. Gamma-ray detection signals detected with the detector ring 12 are sent to the coincidence unit 20. It is considered as one count only when two gamma ray photons are detected simultaneously in positions different to each other in the detector ring 12, and then subsequent data processing may be performed. Thereafter, the top board 16 slides to repeat obtaining of the emission data while changing positions of the subject M sequentially, thereby obtaining emission data with sufficient number of counts for imaging localization of the radiopharmaceutical inside the subject M. Finally, the top board 16 slides again to move the subject M away from the inside of the gantry 11. An examination is to be completed.

Next, description will be given to data processing in the PET device according to Embodiment 2 with reference to FIG. 9. Transmission detection data Tr and emission detection data Em outputted from the detector ring 12 are sent to the fluorescence generating position discrimination unit 21 to identify which scintillation counter crystal has detected the data. Detection data sent from the multi-anode type PMT 3 includes information on fluorescence intensity distributions that the PMT 3 detected, and the fluorescence generating position discrimination unit 21 calculates a center of gravity of fluorescence from the data. Consequently, the fluorescence position is discriminated in x-, y-, and z-directions in FIG. 1. The procedure has been described in Embodiment 1 (see FIG. 8.) As mentioned above, transmission detection data and emission detection data including incident positions of gamma rays are formed and sent to the subsequent absorption correction unit 22. Here, the transmission detection data Tr and the emission detection data Em correspond to the radiation detection data in this invention.

The absorption correction unit 22 performs absorption corrections to the emission detection data Em for eliminating influences of the gamma ray absorption distributions in the subject M that overlaps with the emission detection data Em while referring to the transmission detection data Tr noted above. Thus, detection data showing radiopharmaceutical distributions in the subject M with more accuracy is sent to the image formation unit 23, and then a PET image is to be reconstructed. Finally, the display unit 25 displays the PET image.

According to the foregoing construction in Embodiment 2, a PET device may be provided that may derive generating positions of annihilation gamma ray-pairs more accurately. Each of the four side end faces of the scintillator 2 according to Embodiment 2 is flush. That is, the scintillation counter crystals on the side end face of the scintillator 2 may be arranged accurately. Therefore, when such scintillator 2 is arranged in the PET device 10 described in Embodiment 2, the PET device 10 has increased spatial resolution. Thus, the PET device 10 may be provided that is capable of forming PET images with localization of radiopharmaceutical in the subject being reproduced therein more closely.

This invention is not limited to the foregoing embodiments, but may be modified as follows.

(1) In each of the foregoing embodiments, the gaps of the first reflectors adjacent to one another are gradually narrow as they go from the side end toward the center of the scintillator. The gaps of the first reflectors adjacent to one another may be of equal intervals. As shown in FIG. 10, the first reflectors in the scintillation counter crystal layer 2B as the first scintillation counter crystal layer are assumed, for example, to be of gap e. The e is wider than the gap n of the first reflectors in the scintillation counter crystal layer 2C as the second scintillation counter crystal layer. With the foregoing construction, the first reflectors rb in this modification that are adjacent to one another are determined to have wider gaps so as to compensate the thickness of one first reflector rb. Moreover, as shown in FIG. 10(*b*), the gaps of the first reflectors adjacent to one another may be determined to be gradually wide as they go from the side end of the scintillator 2 toward the center of the scintillator 2.

(2) In each of the foregoing embodiments, the gaps of the second reflectors adjacent to one another are gradually narrow as they go from the side end toward the center of the scintillator. The gaps of the second reflectors adjacent to one another may be of equal interval. Specifically, the second reflectors sa in the scintillation counter crystal layer 2A that are adjacent to one another may be determined to have wider gaps so as to compensate the thickness of one second reflector s. In addition, the gaps of the second reflectors may be of equal intervals. Moreover, the gaps of the second reflectors adjacent to one another may be determined to be gradually wide as they go from the side end of the scintillator 2 toward the center of the scintillator 2.

(3) In each of the foregoing embodiments, the first scintillation counter crystal layer, the second scintillation counter crystal layer, the third scintillation counter crystal layer, and the fourth scintillation counter crystal layer correspond to the scintillation counter crystal layer 2B, the scintillation counter crystal layer 2C, the scintillation counter crystal layer 2A, and the scintillation counter crystal layer 2B, respectively. The first scintillation counter crystal layer may for example correspond to the scintillation counter crystal layer 2A. That is, when a condition that the reflectors have the same construction is satisfied, each of the scintillation counter crystal layer 2A to the scintillation counter crystal layer D may be replaced with another scintillation counter crystal layer.

(4) In each of the foregoing embodiments, radiation corresponds to gamma rays. This invention may for example be adapted for a detector to detect X-rays.

(5) In each of the foregoing embodiments, the scintillation counter crystal is composed of LYSO. Another materials, such as GSO ($Gd_2SiO_5$), may be used in this invention. According to this modification, a radiation detector of low price and a PET device provided therewith may be provided. The scintillation counter crystal layers may be configured so as to have different materials of the scintillation counter crystals.

(6) In each of the foregoing embodiments, the scintillator 2 is composed of four scintillation counter crystal layers. This invention is not limited to this, but may be of construction having increased scintillation counter crystal layers in total number. For instance, it may be formed of eight scintillation counter crystal layers. In this case, four layers close to the PMT 3 are for example formed of GSO, and four layers away from the PMT 3 are for example formed of LYSO. GSO differs from LYSO in its fluorescence decay time constant. Therefore, a construction with eight scintillation counter crystal layers may realize position discrimination of fluorescence in the z-direction.

(7) In each of the foregoing embodiments, the fluorescence detection device is formed of the photomultiplier tube. In this invention, it is also possible to use for example a photodiode and an avalanche photodiode instead of the photomultiplier tube.

(8) The construction of Embodiment 1 is not limited to the PET. For instance, it may be adapted for an SPECT device. It is also applicable to a device, such as PET-CT, that uses both of gamma rays and X-rays for determination. The construction of Embodiment 1 is not limitedly applied to research fields, but may be applied to a nondestructive inspection system of industrial use. It may also be adapted for medical fields.

(9) The construction of Embodiment 2 is for small animals. Configurations of the detector ring of Embodiment 2 may be modified optionally. Consequently, this invention is also applicable to a PET device having a gantry of large bore.

INDUSTRIAL UTILITY

As described above, this invention is suitable for a radiation detector for use in research, medical or industrial fields.

The invention claimed is:

1. A radiation detector comprising
a scintillator to convert radiation emitted from a radiation source into fluorescence; and
a fluorescence detection device to detect fluorescence from the scintillator,
the scintillator being composed of scintillation counter crystal layers having scintillation counter crystals in a block shape arranged in two dimensions so as to be laminated in a direction toward the fluorescence detection device;
the scintillation counter crystal layer having two or more first reflectors that are inserted between the scintillation counter crystals so as to be parallel to one another;
the scintillation counter crystal layer further having two or more second reflectors that are perpendicular to the first reflectors and are inserted between the scintillation counter crystals so as to be parallel to one another;
the scintillator having at least a first scintillation counter crystal layer and a second scintillation counter crystal layer having more first reflectors than the first scintillation counter crystal layer; and
a gap between the first reflectors adjacent to each other provided in the first scintillation counter crystal layer being wider than that between the first reflectors adjacent to each other provided in the second scintillation counter crystal layer such that an overall width of the first scintillation counter crystal layer in an arranging direction of the first reflectors is identical to an overall width of the second scintillation counter crystal layer in the arranging direction.

2. The radiation detector according to claim 1, wherein
the scintillator with the foregoing radiation detector has at least a third scintillation counter crystal layer and a fourth scintillation counter crystal layer having more second reflectors than the third scintillation counter crystal layer, and
a gap between the second reflectors adjacent to each other provided in the third scintillation counter crystal layer being wider than that between the second reflectors adjacent to each other provided in the fourth scintillation counter crystal layer such that an overall width of the third scintillation counter crystal layer in an arranging direction of the second reflectors is identical to an overall width of the fourth scintillation counter crystal layer in the arranging direction.

3. The radiation detector according to claim 1, wherein
each of the first reflectors and second reflectors has two or more grooves formed along a direction toward the fluorescence detection device, and
the first reflectors and second reflectors are integrated by fitting the grooves each provided in the first reflectors and second reflectors to form a reflector lattice frame.

4. The radiation detector according to claim 1, wherein
four scintillation counter crystals are inserted in each of sections divided by a reflector lattice of the reflector lattice frame.

5. The radiation detector according to claim 1, wherein
in the first scintillation counter crystal layer, gaps of the first reflectors adjacent to one another are gradually narrow as they go from one end side of the first reflectors toward the center of the scintillator, supposing that a gap between the first reflectors at one end on the side end face of the scintillator and the first reflectors adjacent to the first reflectors at the one end is a maximum.

6. The radiation detector according to claim 2, wherein
in the third scintillation counter crystal layer, gaps of the second reflectors adjacent to one another are gradually narrow as they go from one end side of the second reflectors toward the center of the scintillator, supposing that a gap of the second reflectors at one end on the side end face of the scintillator and the second reflectors adjacent to the second reflectors at the one end is a maximum.

7. The radiation detector according to claim 1, wherein
in the first scintillation counter crystal layer, gaps of the first reflectors adjacent to one another are gradually wide as they go from one end side of the first reflectors toward the center of the scintillator, supposing that a gap of the first reflectors at one end on the side end face of the scintillator and the first reflectors adjacent to the first reflectors at the one end is a minimum.

8. The radiation detector according to claim 2, wherein
in the third scintillation counter crystal layer, gaps of the second reflectors adjacent to one another are gradually wide as they go from one end side of the second reflectors toward the center of the scintillator, supposing that a gap of the second reflectors at one end on the side end face of the scintillator and the second reflectors adjacent to the second reflectors at the one end is a minimum.

9. The radiation detector according to claim 1, wherein
the first reflectors adjacent to one another have a uniform gap in the first scintillation counter crystal layer.

10. The radiation detector according to claim 2, wherein
the second reflectors adjacent to one another have a uniform gap in the third scintillation counter crystal layer.

11. The radiation detector according to claim 1, wherein
a transparent material is provided for allowing fluorescence to pass through so as to surround each of the scintillation counter crystals that forms the scintillator.

12. Tomography equipment comprising
a detector ring to generate radiation detection data with the radiation detector according to claim 1 being arranged in a ring shape;
a coincidence device to perform coincidence of the radiation detector data;
a fluorescence generating position discrimination device to discriminate a position of generating fluorescence in the detector ring; and
an image formation device to receive analytical data sent from the fluorescence generating position discrimination device to form a sectional image of a subject.

\* \* \* \* \*